Sept. 1, 1970      C. W. HALL ET AL      3,526,060
JIG GRINDER
Filed Jan. 20, 1967      4 Sheets-Sheet 1
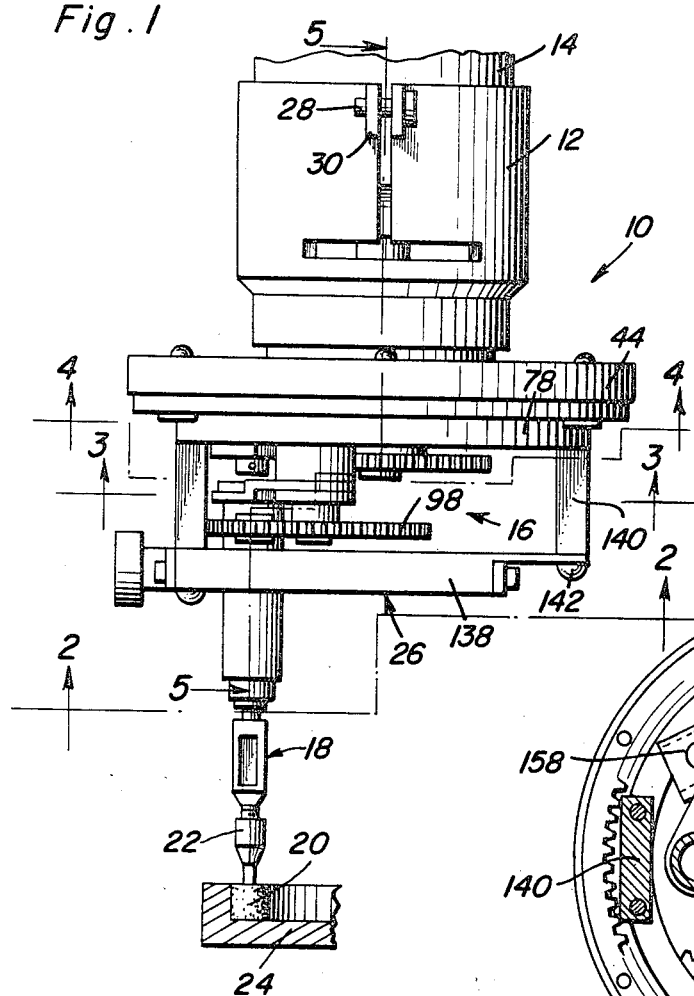
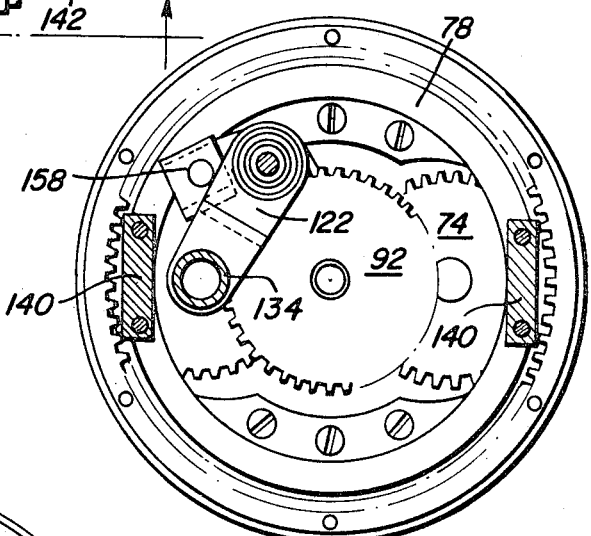
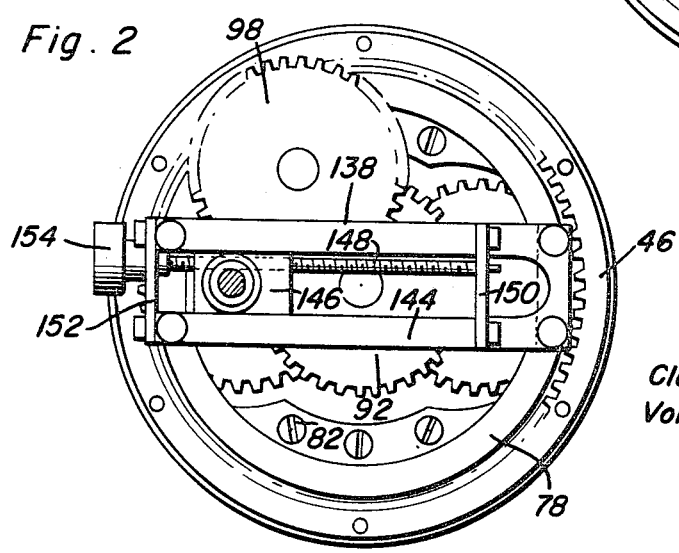
Clifton W. Hall
Clemmon H. Radford, Deceased
Voncile H. Radford, Administratrix
INVENTORS
BY *Clarence A. O'Brien*
*and Harvey B. Jacobson*
Attorneys Sept. 1, 1970     C. W. HALL ET AL     3,526,060

JIG GRINDER

Filed Jan. 20, 1967     4 Sheets-Sheet 2

*Clifton W. Hall*
*Clemmon H. Radford, Deceased*
*By Voncile H. Radford, Administratrix*
INVENTORS BY *Clarence A. O'Brien*
*and Harvey B. Jackson*
Attorneys

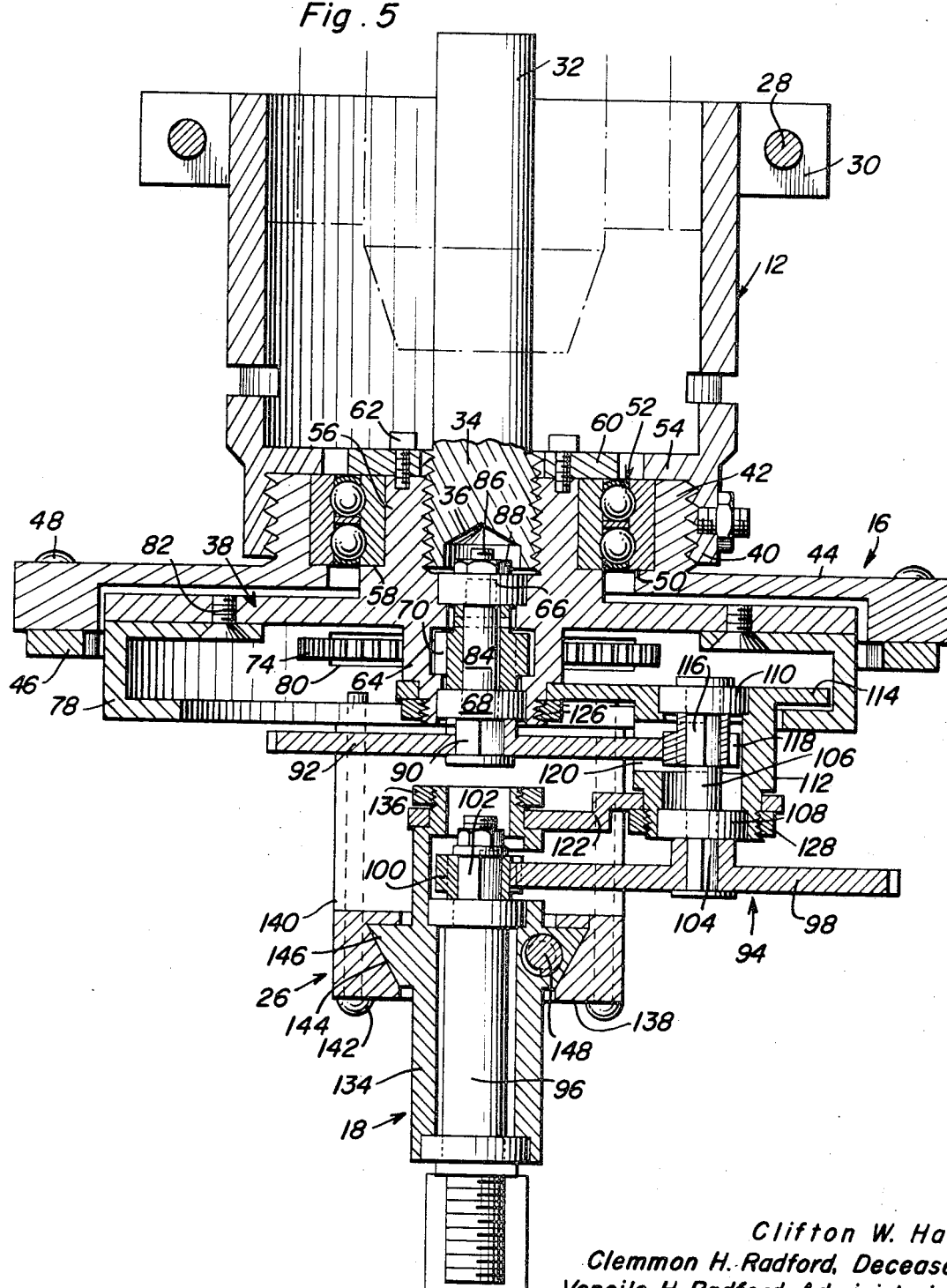

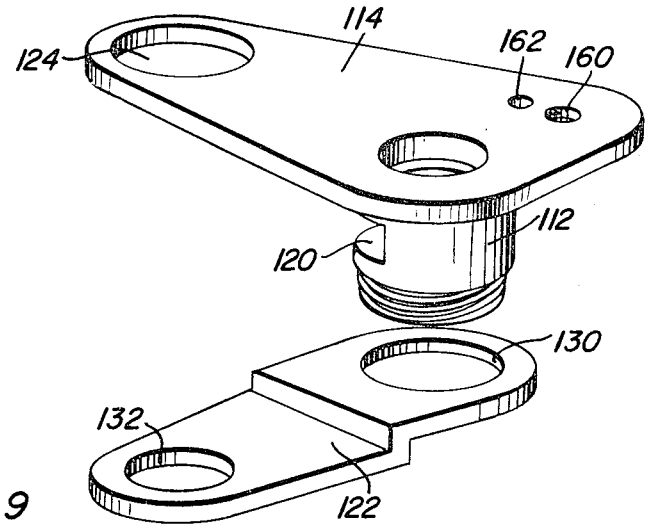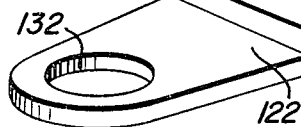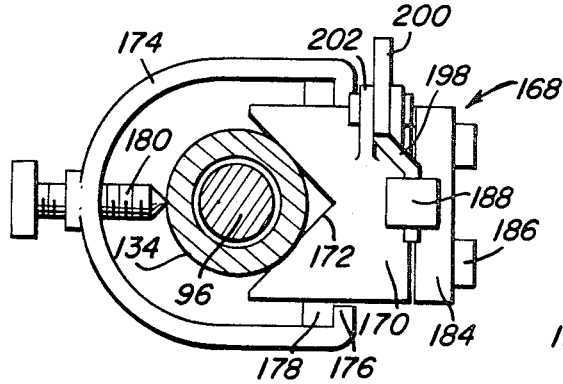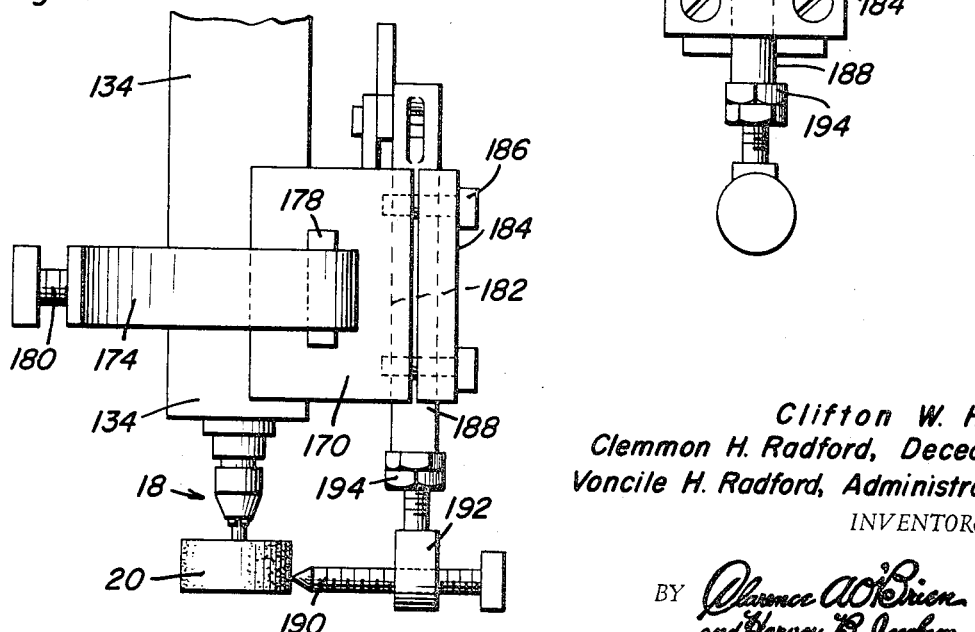

United States Patent Office 3,526,060
Patented Sept. 1, 1970

3,526,060
JIG GRINDER
Clifton W. Hall, Knoxville, Tenn., and Clemmon H. Radford, deceased, late of Clinton, Tenn., by Voncile H. Radford, administratrix, 134 S. Main St., Evergreen, Ala. 36401; said Hall assignor to said Voncile H. Radford
Filed Jan. 20, 1967, Ser. No. 610,730
Int. Cl. B24b 5/00
U.S. Cl. 51—90
12 Claims

ABSTRACT OF THE DISCLOSURE

A drive mechanism for a grinding tool having an input planet gear carrier that rotates the tool about a fixed axis at a low angular speed while the tool is driven about its own axis at an extremely high overdrive speed ratio. The position of the tool axis relative to the fixed axis is adjustable without change in the drive ratio of the gearing. Facilities are also provided for dressing the tool.

BACKGROUND OF THE INVENTION

This invention relates in general to grinding tools and more particularly to a drive attachment for machine tools for rotating and adjusting the position of a grinding tool.

In the grinding tool art, it is of considerable advantage to translate a high speed grinding implement in a circular path at a relatively low speed and yet be able to change the radius of the circular path without affecting or changing the high rotational speed of the grinding implement about its own rotational axis. There is also a considerable problem involved in obtaining a relatively high speed ratio without resorting to large and bulky gear assemblies. Also, to change the position of the driven tool spindle with the requisite degree of precision and maintaining the adjusted position thereof has been a difficult feat particularly where the high speed ratio of the gearing is to be maintained constant. In coping with the foregoing problems, it is also desirable to avoid any difficult and complicated adjustment procedure.

SUMMARY OF THE INVENTION

In accordance with the foregoing invention, the work spindle for a grinding tool is both adjustable in its position relative to a fixed axis and driven at a relatively high speed about its own rotational axis through a novel drive attachment to the power source of a machine tool such as a jig borer or milling machine. Displacement of the driven spindle to an adjusted position is accommodated by means of a linkage arrangement that mounts a connecting gear assembly which drivingly interconnects the spindle with an overdrive planetary gear set, the overdrive ratio of the gear set being increased by the connecting gear assembly itself.

It is therefore a primary object of the present invention to provide a planetary gear assembly through which an extremely high overdrive ratio is obtained in transmitting rotation from an input carrier member to a driven spindle which is translated along a circular path by the carrier member at the same time that it is driven at a high speed about its own axis.

An additional object in accordance with the foregoing object, is to provide a planetary gear assembly which incorporates facilities for accommodating adjustable radial displacement of a driven spindle relative to the fixed input axis of the gearing without changing the gear ratio.

A still further object of the present invention is to provide in combination with the aforementioned planetary gear assembly, removably mounted facilities through which the grinding tool may be dressed.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

FIG. 1 is a side elevational view of the grinder drive attachment of the present invention.

FIG. 2 is a transverse sectional view taken substantially through a plane indicated by section line 2—2 in FIG. 1.

FIG. 3 is a transverse sectional view taken substantially through a plane indicated by section line 3—3 in FIG. 1.

FIG. 5 is an enlarged longitudinal sectional view taken substantially through a plane indicated by section line 5—5 in FIG. 1.

FIG. 8 is a perspective view showing the disassembled parts of the linkage arrangement utilized in the drive attachment.

FIG. 9 is a transverse sectional view showing the grinding tool dressing facilities mounted on the drive attachment.

FIG. 10 is a side elevational view of the dressing facilities shown in FIG. 9.

FIG. 11 is a rear elevational view of the dressing facilities shown in FIGS. 9 and 10.

DESCRIPTION OF THE PREFERRED EMBODIMENT

Figure 4:
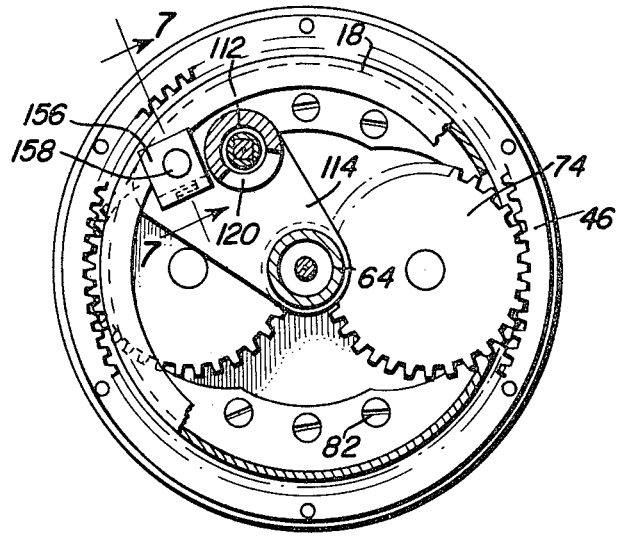
FIG. 4 is a transverse sectional view taken substantially through a plane indicated by section line 4—4 in FIG. 1.

Referring now to the drawings in detail, and initially to FIG. 1, it will be observed that the drive attachment of the present invention generally denoted by reference numeral 10 includes a stationary mounting sleeve 12 clamped to the machine tool 14 with which it is associated in order to suspend therebelow a gear assembly generally referred to by reference numeral 16. The gear assembly powered by a machine tool power source, drives a spindle assembly generally referred to by reference numeral 18 to which a grinding tool 20 is connected by the chuck 22. The grinding tool 20 is thereby driven about its own rotational axis at a relatively high speed while it is being translated along a circular path in order to grind a cylindrical surface on a workpiece 24 for example. The radial position of the spindle assembly 18 and the grinding tool is adjustable by means of an adjustment assembly generally denoted by reference numeral 26.

As shown in FIGS. 1 and 5, the mounting sleeve is slotted so that it may be clamped to the machine tool by the fasteners 28 extending through the clamping lugs 30. Power is transmitted to the gear assembly 16 through an arbor 32 extending through the mounting sleeve 12 along a fixed longitudinal axis. The arbor 32 is accordingly coupled to the power driven member (not shown) associated with the machine tool in any suitable manner such as by a collet chuck. The lower end portion 34 of the arbor is externally threaded for connection to an input member generally referred to by reference numeral 38 in FIG. 5 constituting a planet gear carrier in the gear assembly 16.

The mounting sleeve 12 is provided at its lower end with an internally threaded portion 40 so as to threadedly receive the externally threaded sleeve portion 42 of a stationary plate member 44 to which an annular, reaction orbit gear 46 is secured on the underside by a plurality of circumferentially spaced fasteners 48. The plate member 44 is provided with an internal annular shoulder 50 axially abutting one end of the radially outer race of a double ball bearing assembly 52 which is concentric with the fixed axis about which the arbor 32 is driven. The ball bearing assembly is held assembled between the shoulder 50 and the annular flange 54 projecting radially inwardly from the mounting sleeve 12. The radially inner race of the ball bearing assembly is seated on the external surface of an internally threaded coupling portion 56 of the input carrier member 38 against the shoulder 58. A retainer ring 60 is fastened to the coupling portion 56 by the fasteners 62 in axial abutment with the ball bearing assembly 52 so as to complete the assembly.

Figure 6:
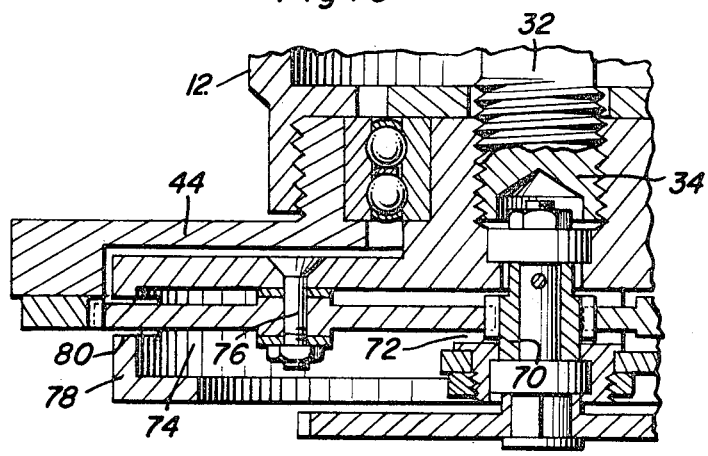
FIG. 6 is a partial longitudinal sectional view through the drive attachment in another angular plane.

As shown in FIGS. 5 and 6, the input carrier member 38 is provided with a tubular projection 64 within which axially spaced bearings 66 and 68 are mounted for rotatably supporting a sun gear 70 about the same fixed axis extending through the arbor 32. The tubular projection is provided with openings 72 into which the planet gears 74 extend for meshing engagement with the sun gear 70. In the illustrated embodiment, two planet gears spaced apart by 180 degrees are employed in order to distribute the load. Each planet gear is rotatably mounted by pins 76 on the carrier member and are of such diameter as to mesh with both the sun gear 70 and the reaction orbit gear 46. Thus, the planet gears 74 extend outwardly of the annular rim 78 through openings 80. The annular rim 78 is secured to the underside of the carrier member 38 by a plurality of circumferentially spaced fasteners 82 as shown in FIG. 5.

The sun gear 70 forms part of a driven gear assembly including the shaft 84 to which the sun gear is fastened having an upper threaded end 86 extending into the recess 36 of arbor 32 and mounting an assembly nut 88 in axial engagement with the bearing 66. The lower end of the shaft 84 has a non-circular portion 90 receiving the driven gear member 92. It will be apparent therefore, that when rotation is imparted through the arbor 32 to the input carrier member 38, the planet gears 74 will walk around the internal reaction orbit gear 46 so as to impart rotation to the driven sun gear 70 at an overdrive ratio of $1+N_o \div N_s$, where $N_o$ equals the number of teeth in the orbit gear 46 and $N_s$ equals the number of teeth in the driven sun gear 70. The driven gear 92 connected to the sun gear 70 will accordingly be rotated about the common fixed axis at a substantially higher speed than the speed of the carrier member 38. This overdrive speed ratio is further increased by a connecting gear assembly generally referred to by reference numeral 94 in FIG. 5 in order to impart rotation to the working spindle 96 in the spindle assembly 18 about its own rotational axis.

The connecting gear assembly 94 includes a gear member 98 in meshing engagement with a pinion gear 100 fastened to the non-circular end portion 102 of the spindle 96. The gear member 98 is itself mounted on a non-circular end portion 104 of a shaft 106 journaled by the spaced bearings 108 and 110 in a tubular connecting portion 112 projecting from a triangular lever member 114. The shaft 106 includes another non-circular portion 116 spaced from the gear member 98 within the tubular connecting portion 112 receiving the pinion gear 118 for rotation with the gear member 98. The pinion gear 118 is aligned with an opening 120 formed in the tubular connecting portion 112 as more clearly seen in FIGS. 5 and 8 so as to mesh with the driven gear member 92 that extends into the opening 120.

With continued reference to FIGS. 5 and 8, it will be observed that the lever member 114 forms part of a linkage arrangement which includes the link element 122. The lever member 114 is therefore provided with an opening 124 receiving the lower end portion of the tubular projection 64 on the input carrier member 38 so as to accommodate angular displacement of the lever member about the fixed axis. A retainer ring 126 is threadedly mounted on the end of the tubular projection 64 so as to hold the lever member is assembled position on the input carrier member. Similarly, the lower end portion of the tubular connecting portion 112 is externally threaded so as to receive the retainer element 128 to thereby hold the link element 122 pivotally assembled thereon, the link element being provided with an opening 130 receiving the lower end portion of the tubular connecting portion 112 of the lever member. An opening 132 is also formed in the link element at an end opposite the opening 130 so as to receive the upper end portion of a tubular housing 134 associated with the spindle assembly 18. A retainer element 136 as shown in FIG. 5 holds the link element 122 assembled on the tubular housing. It will be apparent therefore, that the spindle assembly 18 may be displaced relative to the fixed axis of the gear assembly causing angular displacement of the lever member 114 about the fixed axis so as to preserve the center-to-center distance between the driven gear member 92 and the pinion gear 118 in mesh therewith. The link element 122 on the other hand preserves the center-to-center spacing between the gear member 98 of the connecting gear assembly and the pinion gear 100 connected to the spindle 96. Accordingly, the spindle 96 will be driven about its own rotational axis at a gear ratio equal to $$1 + \frac{N_o}{N_s} \frac{N92}{N118} \frac{N98}{N100}$$

where N92, N98, N118 and N100 represent the number of gear teeth in the gears 92, 118, 98 and 100, respectively. Further, there is no variation in the aforementioned gear ratio despite the adjustable displacement of the spindle assembly since the center-to-center spacing of the gears is maintained by the linkage arrangement described.

The spindle assembly is displaced in a radial direction relative to the common fixed axis of the gear assembly by means of the adjustment assembly 26 aforementioned which includes a guide bracket 138 supported by the spacers 140 secured to the rim 78 of the carrier member. Fasteners 142 accordingly secure the spacers 140 and guide bracket 138 to the carrier member diametrically straddling the driven gear assembly. A dovetail slot 144 is formed in the guide bracket 138 so as to slidably mount the spindle assembly 18. A slide portion 146 is accordingly formed on the tubular housing 134 for reception within the dovetail slot 144. An actuating screw 148 is threadedly received within the guide portion 146 of the tubular housing and is rotatably mounted adjacent its opposite ends on the bracket 138 by the bearing plates 150 and 152 as shown in FIG. 2. An actuating knob 154 is connected to one end of the actuating screw shaft 148 so that by rotation thereof the spindle assembly may be radially displaced relative to the fixed axis of the gear assembly in order to change the radius of the circular path through which the spindle assembly is moved by the input carrier member 38 to which the adjustment assembly and the spindle assembly is connected.

Figure 7:
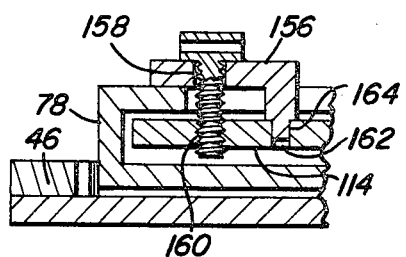
FIG. 7 is an enlarged partial sectional view taken substantially through a plane indicated by section line 7—7 in FIG. 4.

In order to firmly hold the spindle assembly in the radial position to which it is adjusted, the lever member 114 is releasably clamped to the rim portion 78 of the carrier member by a clamping element 156. The clamping element 156 is mounted on the lever member 114 by means of a fastener screw element 158 extending through a threaded aperture 160 in the lever member as more clearly seen in FIG. 7. An aperture 162 is also formed in the lever member for receiving the projection 164 on the spacing flange of the clamping element 156 whereby the clamping element is positioned so as to overlie the annular rim portion 78 of the input carrier member. By tightening the screw fastener element 158, the clamping element 156 may firmly clamp the lever member to the carrier member in the position to which it is moved, corresponding to the adjusted position of the spindle assembly. It will be apparent therefore, that before the spindle assembly may be adjusted to a new position, the clamp element must be released by loosening the fastener screw element 158.

Referring now to FIGS. 9, 10 and 11, a grinding wheel dressing device 168 is shown mounted on the spindle assembly in any adjusted position. The device includes a V guide block 170 having engaging surfaces 172 clamped to the tubular housing 134 of the spindle assembly by means of the U-shaped clamp element 174. The clamp element 174 is provided therefore with inwardly projecting ends 176 engaging the lugs 178 projecting from the guide block 170. A screw element 180 is threadedly mounted by the clamp 174 so as to engage the tubular housing 134 opposite the surfaces 172 on the guide block as more clearly seen in FIG. 9. Also formed in the guide block, is a slide passage 182 closed by a cap 184 adjustably spaced from the guide block by the fasteners 186 so as to loosely receive a non-circular shank 188 associated with a dresser point implement 190. The implement 190 is threadedly mounted in the nut 192 adjustably secured to the lower end of the shank 188 by the locknuts 194. Accordingly, the dresser implement may be adjustably positioned along directions parallel to and perpendicular to the rotational axis of the spindle 96 to which the grinding tool 20 is connected.

In order to dress the grinding tool along its axial length, the upper end portion of the shank 188 is provided with an opening 196 receiving the arm 198 of a manually displaceable lever 200 pivotally mounted above the guide block 170 by the pivot projections 202. Accordingly, the lift lever 200 may be downwardly displaced in order to raise the dresser implement 190 to an upper position so that upon release of the lift lever, the dresser implement will fall under the urge of gravity and dress the axial length of the grinding tool as it is being rotated.

The drive attachment described also protrudes by a minimum amount from the power source comparing favorably with fluid or electric drive controls to reduce chatter and vibration. Also, since power is directly transmitted to the work spindle, heavier work load requirements may be accommodated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a power driven member rotatable about a fixed drive axis and a tool having a rotational axis disposed in parallel spaced relation to the fixed axis, a drive mechanism for simultaneously transmitting movement to the tool at a high rotational speed about said rotational axis and at a low speed about said fixed axis comprising, a planetary gear assembly having a carrier rotatably mounting a planet gear enmeshed with a reaction gear and driven gear means, coupling means connecting the carrier to the power driven member, support means on the carrier rotatably supporting the driven gear means for rotation about said fixed axis, adjustment means fixed to the carrier and operatively mounting said tool for selective radial displacement thereof relative to said fixed axis, link means pivotally interconnecting said carrier and the spindle, connecting gear means rotatably mounted by the link means for drivingly interconnecting the driven gear means and the spindle and means for locking the link means to the carrier to hold the tool in an adjusted position to which the tool is displaced by the adjustment means.

2. The combination of claim 1 wherein said adjustment means comprises a slide bracket mounted on the carrier, a tubular housing rotatably mounting the tool and the link means in axially spaced relation to each other, guide means fixed to the tubular housing for slidable mounting thereof in the slide bracket and selective actuating means mounted by the bracket and engageable with the guide means for displacement of the tubular housing in a radial direction relative to the fixed axis, said tool having a pinion connected thereto aligned with an opening in the tubular housing axially spaced between the guide means and the link means, said connecting gear means projecting into the opening for meshing engagement with said pinion.

3. The combination of claim 2 including means removably mounted on said adjustment means for dressing the tool.

4. The combination of claim 3 wherein said removably mounted dressing means comprises a guide block having a slide passage formed therein, means clamping the guide block to the tubular housing with the slide passage parallel to the rotational axis of the tool, a dresser implement loosely mounted in the slide passage of the guide block, and lift means engageable with the dresser implement for elevating the same to a position from which the implement is guidingly moved under the force of gravity.

5. The combination of claim 4 wherein said link means comprises a lever member pivotally mounted by the carrier support means, a link element pivotally connected to the adjustment means and pivotal connecting means interconnecting the lever member with the link element and rotatably mounting the connecting gear means.

6. The combination of claim 5 wherein said pivotal connecting means comprises a tubular projection on the lever member having an opening into which said driven gear means extends for meshing engagement with said connecting gear means.

7. The combination of claim 6 wherein said lock means comprises a clamp element engageable with the carrier and fastener means securing the clamp element to the lever member of the link means.

8. The combination of claim 1 wherein said link means comprises a lever member pivotally mounted by the carrier support means about said fixed axis, a link element pivotally connected to the adjustment means and pivotal connecting means interconnecting the lever member with the link element and rotatably mounting the connecting gear means.

9. The combination of claim 8 wherein said pivotal connecting means comprises a tubular projection on the lever member having an opening into which said driven gear means extends for meshing engagement with said connecting gear means.

10. The combination of claim 9 wherein said lock means comprises a clamp element engageable with the carrier and fastener means securing the clamp element to the lever member of the link means.

11. The combination of claim 1 wherein said link means comprises a lever member pivotally mounted by the carrier support means about said fixed axis, a link fixed element pivotally connected to the adjustment means and pivotal connecting means interconnecting the lever member with the link element and rotatably mounting the connecting gear means, said lock means comprising a clamp element engageable with the carrier and fastener means securing the clamp element to the lever member of the link means.

12. In combination with a power driven member rotatable about a fixed drive axis and a grinding tool having a rotational axis disposed in parallel spaced relation to the fixed axis, a drive mechanism for simultaneously transmitting movement to the tool at a high rotational speed about said rotational axis and at a low speed about said fixed axis, adjustment means mounted by the drive mechanism for selective radial displacement of the tool relative to the fixed axis, and means removably mounted on said adjustment means for dressing the tool, said removably mounted dressing means comprising a guide block having a slide passage formed therein, means clamping the guide block to the adjustment means with the slide passage parallel to the rotational axis of the tool, a dresser implement loosely mounted in the slide passage of the guide block, and lift means engageable with the dresser implement for elevating the same to a position from which the implement is guidingly moved under the force of gravity.

References Cited

UNITED STATES PATENTS

| | | | |
|---|---|---|---|
| 961,969 | 6/1910 | Klingloff | 51—241 |
| 1,631,596 | 6/1927 | Kempton. | |
| 2,715,806 | 8/1955 | Hancock | 51—90 X |
| 2,802,320 | 8/1957 | Nagle | 51—90 X |
| 3,149,440 | 9/1964 | Maguire | 51—90 |
| 3,213,845 | 10/1965 | Blahut et al. | 125—11 |

LESTER M. SWINGLE, Primary Examiner

U.S. Cl. X. R.

51—241; 125—11